May 23, 1972 G. L. McMILLIN, JR 3,664,609

TAPE RECORDER BRAKE ASSEMBLY

Filed May 25, 1970

INVENTOR:
GRANT L. McMILLIN, JR.
By Mason, Kolehmainen, Rathburn & Wyss
Attorneys United States Patent Office 3,664,609
Patented May 23, 1972

3,664,609
TAPE RECORDER BRAKE ASSEMBLY

Grant L. McMillin, Jr., Racine, Wis., assignor to Webster Electric Company, Inc., Racine, Wis.

Filed May 25, 1970, Ser. No. 40,096
Int. Cl. B11b 15/32; G03b 1/04
U.S. Cl. 242—204 10 Claims

ABSTRACT OF THE DISCLOSURE

A tape recorder brake assembly stops the tape takeup and supply reels quickly and without tape breakage or spillage in the event of a power failure during high speed tape handling operations. Each reel is provided with a brake mechanism including a solenoid normally energized to overcome a spring force and to withdraw a brake shoe from the reel drive shaft. The brake shoe is supported on an arm fastened to a slot in the solenoid armature by a resilient coupling. When the solenoid is deenergized, as upon a power failure, the brake shoe is applied to the shaft by the spring. The arm extends through a slot which acts as a fulcrum or pivot point for the arm. The slot, arm and shoe are arranged so that if the reel is moving in the supply direction the braking force is greater than if the reel is moving in the takeup direction. The braking force developed is sufficiently large to bring the reels quickly to a halt, but the braking force differential between the two reels is not great enough to stretch or break the tape.

The present invention relates to a brake assembly for stopping the motion of tape reels in a tape recorder or reproducing device.

The brakes for reels in a tape recorder or reproducer must be designed so that the braking force is greater when a reel is moving in the tape supply direction than when the reel is moving in the tape takeup direction. If the brakes are not so designed, it is possible for the tape supply reel to continue rotating longer than the tape takeup reel, thereby spilling tape from the tape supply reel. The force differential provided by the brake, however, must not be so great as to cause tape stretch or breakage. Brakes designed so as to avoid both tape spillage and tape breakage may be said to incorporate a differential braking feature.

One known type of brake incorporating a differential braking feature is the belt type brake wherein a flexible belt or band is wrapped around a reel driving shaft and is loaded at one end by a spring. A differential braking action is provided by the fact that shaft rotation in one direction tends to add to the force which the spring applies to the band, while shaft rotation in the opposite direction tends to reduce the force which the spring applies to the band. Braking arrangements of this type have proved satisfactory in large commercial tape recorders for studio use, but their complicated structure renders them impractical for use in the simpler varieties of tape recorders found in homes, classrooms, and in language laboratories. Simpler arrangements have been proposed wherein a brake shoe is mounted upon an arm or other support in such a manner that the brake shoe is pressed in an off-center manner against a reel driving shaft to give a wedge or snub effect for one direction of shaft rotation only. Unless carefully adjusted, snubbing arrangements of this type can give an excessive tape force differential and can stretch or break the tape. This excessive differential can be minimized by reducing the overall braking force, but such a reduction in braking force increases the time it takes the tape reels to cease rotation. The addition of extra braking surfaces and springs can overcome the deficiencies of conventional snubbing arrangements, but only at the cost of increased price and complexity.

Important objects of the present invention are to provide an extremely simple brake assembly incorporating a differential braking feature; to provide a braking system in which shaft rotation in one direction develops a limited wedge or snub effect, yet shaft rotation in the opposite direction develops a substantial braking force; to provide an improved braking system having a minimum of moving parts; and to provide a braking system that automatically applies the brakes in case of a power failure.

In brief, the present invention provides a brake assembly for use on the reel driving shafts of a tape recorder or reproducer. The assembly includes two brakes, each including a lever or arm carrying a braking surface at one end. A spring biases the lever generally along a radial line toward the center of a rotating shaft and urges the braking surface against the shaft. A solenoid, when energized, pulls the lever away from the shaft and thereby releases the brake. In case of a power failure or other contingency, the solenoid is deactuated and the brake is automatically applied.

In accordance with an important aspect of the invention, the brake incorporates a novel differential braking mechanism. The lever which is pushed against the shaft by the spring is flexibly attached to the solenoid armature at the end of the lever farthest from the braking surface in such a manner that it can pivot slightly about this connection to the armature. Additionally, the braking surface extends a substantial distance tangent to the shaft and is positioned to one side of the normal point of tangency so that the main axis of the lever and the braking surface together form an L-shaped configuration. Shaft rotation in one direction causes the braking surface to become tangent to the shaft and produces a mild snubbing or wedge effect. This mild effect slightly increases the effectiveness of the braking mechanism for rotation in one direction. Shaft rotation in the other direction pivots the lever so that the braking surface is not tangent to the shaft and no snubbing or wedge effect is achieved. Since the lever is still held substantially perpendicular to the shaft, the braking action is still substantial. To further stabilize and accentuate the differential braking effect, a stop or barrier is located on one side of the lever. This stop or barrier prevents the lever from pivoting under the influence of shaft rotation as far in the snubbing direction as it pivots in the other direction. The stop or barrier limits the amount of snubbing action which can be developed and therefore gives relatively precise control over the amount of differential braking force which is developed by the brake.

The invention together with the above and other objects and advantages will appear from the following detailed description of an embodiment of the invention shown in the drawings, wherein.

Figure 1:
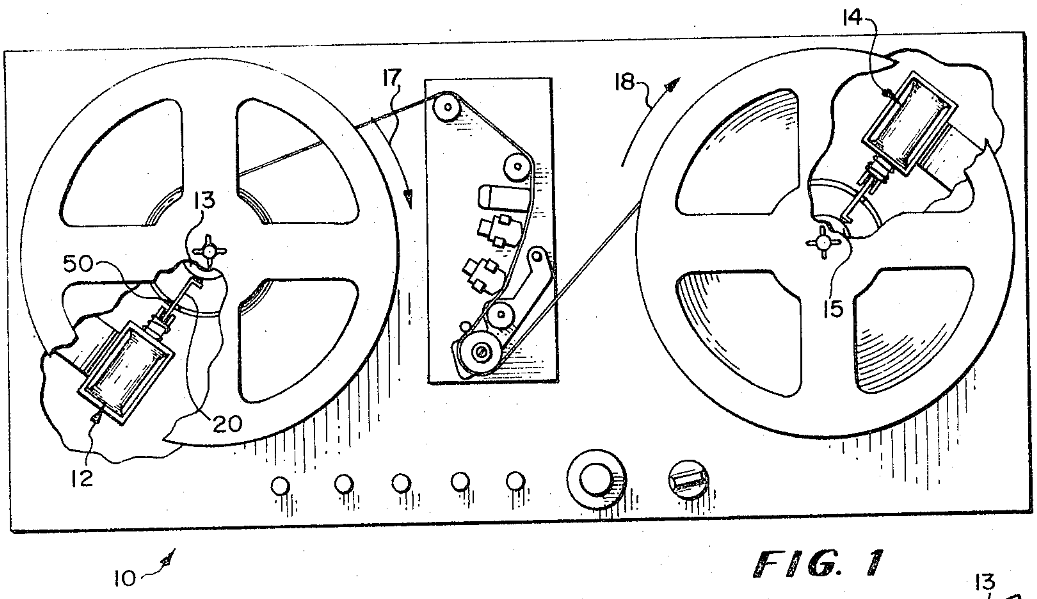
FIG. 1 is a plan view of a magnetic tape recorder-reproducer the surface of which has been partially cut away to reveal a pair of brakes constructed in accordance with the present invention.

Referring now to the drawings, FIG. 1 shows a tape recording-reproducing mechanism 10 including a brake 12 for stopping the rotation of a reel driving shaft 13 and the brake 14 for stopping the rotation of a reel driving shaft 15. In accordance with the present invention, the brakes 12 and 14 are designed to supply more braking action to the shafts 13 and 15 when the shafts 13 and 15 are rotating so as to supply tape than when the shafts 13 and 15 are rotating so as to take up tape. For example, when the shaft 13 is supplying tape as indicated by the arrow 17 and when the shaft 15 is taking up tape as indicated by the arrow 18, the braking action supplied by the brake 12 is sufficiently stronger than the braking action supplied by the brake 14 so that in case of a power failure motion of the reels is brought quickly to a halt while a tension is applied to the tape so that spillage is avoided. The brakes 12 and 14 are designed so that this tape tension does not exceed the tensile yield strength of the tape.

Figures 2, 3, 4:
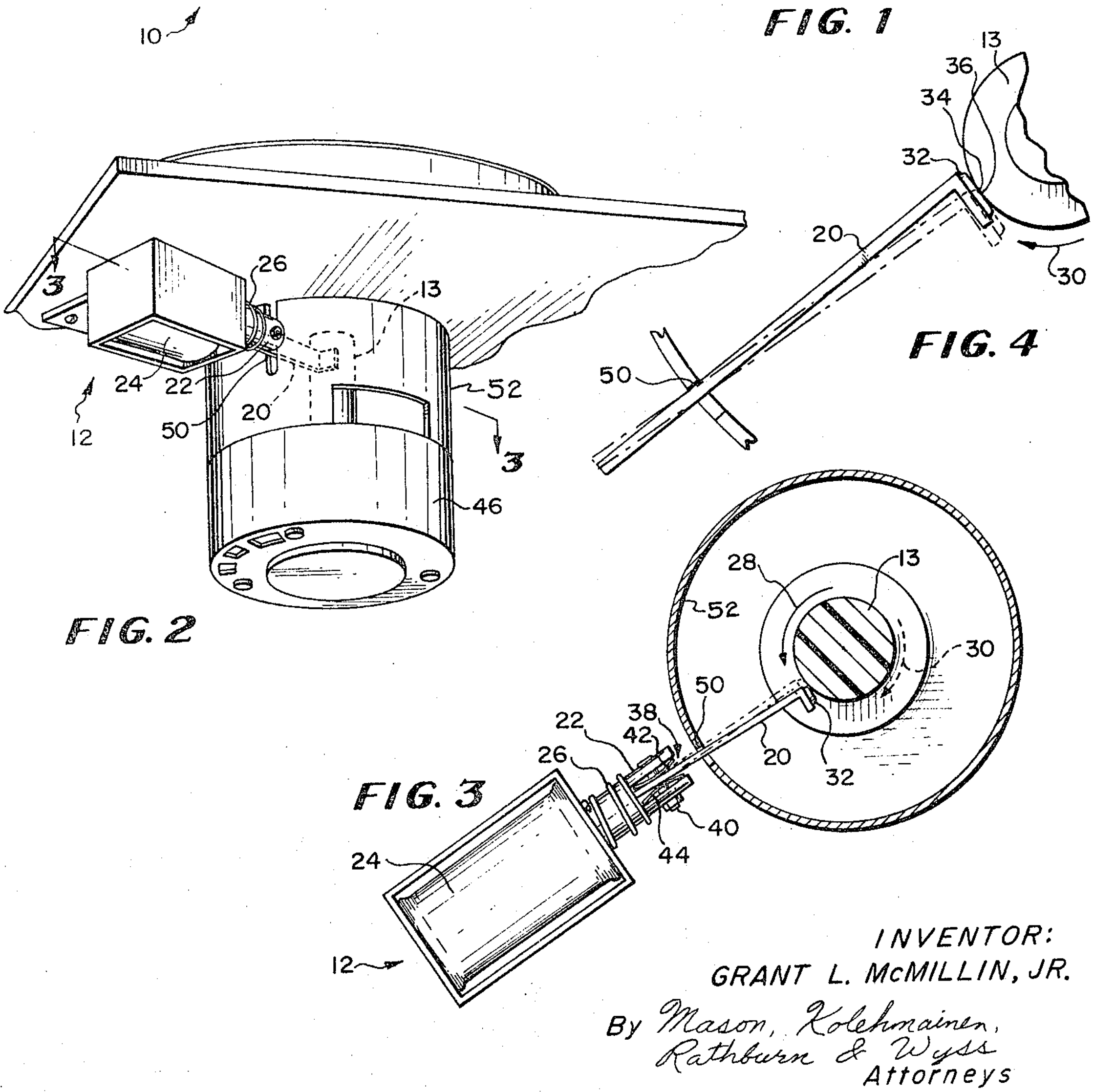
FIG. 2 is a fragmentary underside view in perspective of the tape recorder shown in FIG. 1 showing more details of one tape recorder brake.
FIG. 3 is an enlarged sectional plan view taken along the line 3—3 in FIG. 2 and revealing the precise structural details of the braking mechanism.
FIG. 4 is a greatly enlarged fragmentary view illustrating a portion of one brake mechanism.

FIGS. 2–3 show the details of the brake 12. The brake 14 is identical to the brake 12 except for the direction in which it acts and does not require a separate description. The brake 12 comprises an L-shaped lever 20 that is flexibly attached to the armature 22 of a solenoid 24. A spring 26 biases the armature 22 and the lever 20 perpendicularly towards the shaft 13. When the solenoid 24 is not energized, the spring 26 drives the lever 20 against the shaft 13 to provide a brake action. Normally the main axis of the lever is arranged substantially along a line extending radially from the shaft axis.

In accordance with one aspect of the present invention, the joint coupling the lever 20 and the armature 22 is slightly flexible so that rotation of the shaft 13 may cause lever 20 to pivot about its connection with the armature 22, as shown in FIG. 3. When the shaft 13 rotates in the direction of tape takeup illustrated by arrow 28, the shaft 13 pivots the lever 20 to the position shown by solid lines in FIG. 3. This pivoting action reduces the effective braking force of the lever 20 slightly by causing the lever 20 to press against the shaft 13 at an acute angle rather than perpendicularly. In effect the lever is able to "slide off" the shaft to some extent. When the shaft 13 rotates in the tape supply direction illustrated by the broken arrow 30, the shaft 13 tends to pivot the lever 20 in the opposite direction, as indicated by broken lines in FIG. 3. In accordance with the invention a stop or barrier 50 formed by a slot in a shaft housing 52 limits the deflection of the lever in this direction, however, and keeps the lever 20 in firm engagement with the shaft 13 when the shaft 13 rotates in the direction of the broken arrow 30.

In accordance with another aspect of the present invention, the lever 20 includes a braking surface 32 that is disposed tangentially to the shaft 13 and substantially to one side of the main axis of the lever 20. This arrangement provides a slight snubbing or wedging effect when the shaft 13 rotates in the direction of the arrow 30. More particularly, shaft rotation in the direction of the arrow 30 tends to deflect the lever 20 in such a manner that the brake surface 32 becomes tangent to the shaft 13. Since the braking surface 32 is perpendicular to the main axis of the lever 20, deflection of the lever 20 caused by rotation of the shaft 13 in the direction of the arrow 30 tends to shift the contact point between the brake surface 32 and he shaft 13 and the braking surface 32 and the lever 20 become somewhat wedged between the shaft 13, the barrier 50 and the armature 22. This wedging is illustrated more clearly and in an exaggerated manner in FIG. 4. When the shaft 13 is not rotating, the lever 20 is in the position indicated by dotted lines in FIG. 4 and the contact point between the braking surface 32 and the shaft 13 is indicated at 34. As the shaft 13 rotates in a clockwise direction, as indicated by an arrow 30, the lever 20 is pivoted against and about the stop 50 to some extent. Since the braking surface 32 is perpendicular to the main axis of the lever 20, the contact point between the surface 32 and the shaft 13 shifts to 36, slightly counterclockwise from the original contact point 34.

FIG. 4 exaggerates the manner in which the lever 20 and the contact surface 32 become wedged between the stop 50 and the contact point 36 on the rotating shaft 13. Rotation of the shaft 13 in the direction of the arrow 30 tends to drive the braking surface 32 and the lever 20 deeper into this wedging position, thereby increasing the braking action of the brake 12. When the shaft 13 rotates in a counterclockwise direction, as indicated by the arrow 28 in FIG. 3, there is no snubbing or wedging action, and since the lever 20 is not restrained, the surface 32 can "slide off" the shaft 13 to some extent.

Referring again to FIG. 1, rotation of the shaft 13 in the direction of the arrow 17 tends to snub or wedge the lever 20 between the shaft 13 and the stop 50 and thereby applies increased braking force to the shaft 13. Rotation of the reel 15 in direction of the arrow 18 does not produce a snubbing or wedging action, and therefore the brake 14 applies less force to the shaft 15 than is applied to the shaft 13 by the brake 12. The shaft 13 applies sufficient drag to keep the tape taut while the mechanism comes to a halt. The force differential is kept low by the design, and the tape is not broken by this action. The force supplied by both of the brakes 12 and 14 is sufficiently high to bring the mechanism to a halt quickly.

The flexible connection between the lever 20 and the armature 22 comprises a notch 38 cut into the armature 22. A pin 40 passes through both sides of the notch 38 and also through an extremity of the lever 20 so as to loosely attach the lever 20 to the armature 22. The looseness of this connection is then taken up by a pair of annular spring washers 42 and 44 positioned on either side of the extremity of the lever 20 between the lever 20 and the sides of the notch 38. The washers 42 and 44 allow the lever 20 some freedom to pivot in response to motion of the shaft 13, but limit this pivoting freedom so that the lever 20 never strays far from an orientation perpendicular to the surface of the shaft 13. The spring 44 may buckle laterally to allow the wedging action to take place.

As mentioned above, the solenoid 24 is energized whenever it is desired to pull the braking surface 32 away from the shaft 13. In the preferred embodiment of the present invention, the solenoid 24 is actuated whenever the tape recorder is in use. At the end of normal recording or playback operations and also at the end of high speed forward and rewind operations, braking for the shaft 13 is provided by a motor 42 shown in FIG. 2 which electrically applies a force that limits rotation of the shaft 13. The shaft 15 is equipped with a similar braking motor. The brakes 12 and 14 are used to stop rotation of the shafts 13 and 15 during a high speed forward or reverse transport of the tape should power to the tape recorder be discontinued due to power failure, inadvertent disconnection of the plug connector, or the like.

While there has been described the preferred embodiment of the present invention, it will be understood that numerous modifications and changes will occur to those skilled in the art. It is therefore intended by the appended claims to cover all such modifications and changes as come within the true spirit and scope of the present invention.

What is claimed as new and desired to be secured by Letters Patent of the United States is:

1. A differential brake assembly for a tape recorder and/or reproducer of the type having a pair of rotatable spool drive shaft means, said assembly comprising a pair of brake mechanisms each including a lever arm having an axis extending generally along a radial line extending from the shaft axis, spring means for urging the arm along its axis toward the shaft, electrically operated means for moving the arm away from the shaft, mounting means mounting the arm for pivotal movement about a point spaced from the shaft, an abutment disposed only on one side of the arm between said point and the shaft for limiting pivotal movement of the arm to a first side of said radial line, a brake surface supported on said arm and generally normal to said arm axis and lying substantially on the second side of said radial line, a shaft housing surrounding said shaft, a slot in said housing, said arm extending through the slot, and one edge of said slot defining said abutment.

2. A brake for a reel driving shaft of a magnetic tape recorder and/or reproducer, said brake comprising:

a lever having first and second extremities and having an axis defined as passing through the first and second extremities;

brake excitation means attached to the first extremity of said lever for driving the second extremity of said lever perpendicularly against the side of said shaft when a braking action is desired, said means allowing shaft rotation to pivot said lever a limited distance; and a planar braking surface perpendicular to the lever axis, attached to the second extremity of said lever, and lying substantially on one side of the lever axis.

3. A brake in accordance with claim 2 wherein the brake excitation means comprises a solenoid driven armature attached to the first extremity of said lever.

4. A brake in accordance with claim 3 wherein the solenoid is energized whenever a braking action is not desired and further including a spring coupled between the lever and a fixed point to force said lever against the shaft whenever the solenoid is deenergized.

5. A brake for a reel driving shaft of a magnetic tape recorder and/or reproducer, said brake comprising:

a lever having first and second extremities and having an axis defined as passing through the first and second extremities;

brake excitation means attached to the first extremity of said lever for driving the second extremity of said lever perpendicularly against the side of said shaft when a braking action is desired, said means allowing shaft rotation to pivot said lever a limited distance;

a stationary stop positioned at one side of said lever to further limit the amount of lever pivoting caused by shaft rotation in one direction without further limiting the amount of lever pivoting caused by shaft rotation in the reverse direction; and a planar braking surface perpedicular to the lever axis, attached to the second extremity of said lever and lying substantially on one side of the lever axis.

6. A brake in accordance with claim 5, wherein the brake excitation means comprises a solenoid driven armature attached to the first extremity of said lever.

7. A brake in accordance with claim 6 wherein the solenoid is energized whenever a braking action is not desired and further including a spring coupled between the lever and a fixed point to force the lever against the shaft whenever the solenoid is deenergized.

8. A brake in accordance with claim 5 wherein the stationary stop and the planar braking surface lie substantially on opposite sides of the lever axis from one another.

9. A brake in accordance with claim 5 wherein the brake excitation means includes an armature flexibly attached to the second extremity of said lever, said flexibility being sufficiently stiff so that shaft rotation can pivot said lever a limited distance about the junction of said armature with said lever.

10. A brake in accordance with claim 9 wherein said junction point also permits limited lateral motion of said lever.

References Cited

UNITED STATES PATENTS 3,016,208 1/1962 Herrmann -------- 242—204 X
3,006,566 10/1961 Loewe ------------- 242—204

LEONARD D. CHRISTIAN, Primary Examiner

U.S. Cl. X.R.

242—75.4